D. T. ELLIS.
CLAMPS OR DEVICES FOR ATTACHING HOSE TO COUPLINGS.
No. 191,039. Patented May 22, 1877.
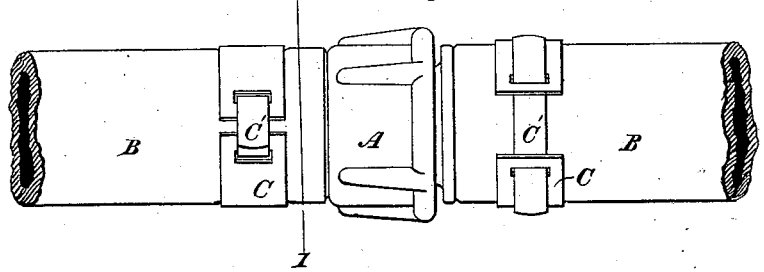
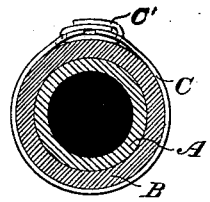
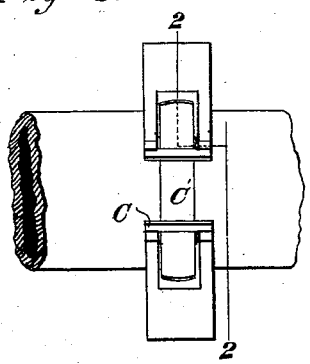
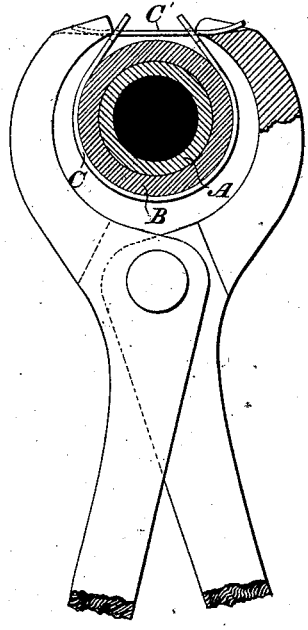
WITNESSES
INVENTOR
David T. Ellis.
By his Attorneys,

UNITED STATES PATENT OFFICE.

DAVID T. ELLIS, OF WARE, MASSACHUSETTS, ASSIGNOR TO THE BELKNAP MANUFACTURING COMPANY, OF BRIDGEPORT, CONNECTICUT.

IMPROVEMENT IN CLAMPS OR DEVICES FOR ATTACHING HOSE TO COUPLINGS.

Specification forming part of Letters Patent No. 191,039, dated May 22, 1877; application filed April 7, 1877.

*To all whom it may concern:*

Be it known that I, DAVID T. ELLIS, of Ware, in the county of Hampshire and State of Massachusetts, have invented certain new and useful Improvements in Clamps or Devices for Attaching Hose to Couplings, of which the following is a specification:

The object of my invention is to connect hose or pipe with couplings in a cheap, expeditious, and secure manner, which end I attain by the employment of a strip of metal flexible enough to conform to the contour of the hose and coupling, provided with an aperture in each end, in combination with an auxiliary strip of metal adapted to be passed through the apertures of the main strip, with its ends more or less projecting therefrom, to constitute shoulders or bearings for proper tongs, by which means the main strip is drawn or forced tightly around the hose, and locked by bending over the ends of the auxiliary strip.

In the accompanying drawings, Figure 1 represents a view, in elevation, of a hose-coupling with the hose connected therewith by my improved device; Fig. 2, a section through the hose and coupling on the line 1 1 of Fig. 1; Fig. 3, a top or plan view with the clamp about to be forced around the pipe by suitable tongs; Fig. 4, a side view of the tongs, showing the manner of applying the clamp, the hose and coupling being in section; and Fig. 5, a perspective view of the head of the tongs for applying the clamps.

The coupling A and hose or pipe B are of the usual construction, the ends of the coupling being inserted in the open ends of the hose. When the coupling is thus inserted I secure the hose thereto by means of a clamp applied to its periphery, consisting of a strip, C, of metal flexible enough readily to conform to the contour of the hose, provided with an aperture in each end, through which apertures is passed an auxiliary strip, C′, of metal of proper length, &c., the ends of which are left projecting a sufficient distance beyond the apertures to afford shoulders or bearings for suitable tongs or other proper instrument, by which the main strip is forced or drawn tightly around the hose, the ends of the auxiliary strip being then bent over to securely hold or lock the band in position, as clearly shown in the drawings.

The strips are plain flat pieces of metal, and may be cut or stamped out of sheet metal of the proper character.

It will be seen by my invention that hose of different thicknesses and diameters may be securely fastened to their couplings without necessitating a change in the length of the clamping-strip, the auxiliary strip readily compensating any variation in size of the hose or coupling, it being only necessary that sufficient of the ends of the auxiliary strip should be left projecting from the apertures in the main strip to afford bearings for the tongs, which are preferably provided with recesses for the reception of the projecting ends, as shown in the drawings.

My invention may readily be employed for repairing breakages, and in making extensions of the hose.

I am aware that it is not new to construct a hose-clamp in one piece, with perforations at one end and a tongue at the other, for the purpose of interlocking the two ends, and do not claim such a device.

By making my clamp in two pieces, and causing the auxiliary strip to project through the perforations in the ends of the main strip, I am enabled to apply the pressure of the clamping-tongs equally on both ends of the clamp, and exert a uniform drawing action, which insures a very tight joint without the use of studs or projections, on the clamp itself, and thus simplify its cost of production, while increasing its efficiency.

I claim as my invention—

1. A hose-clamp consisting of a main strip with apertures in its ends, in combination with an auxiliary strip adapted to pass through the apertures of the main strip, with its ends projecting therefrom, to afford bearings for an instrument by which the clamp is applied, the ends of the auxiliary strip being bent over to lock the clamp in place, substantially as described.

2. The combination, substantially as hereinbefore set forth, of the hose or pipe, a coupling or splice inserted therein, and a clamp to securely connect the hose and coupling together, consisting of a main strip with apertures in its ends, and an auxiliary forcing-strip passing through the apertures in the main strip, and having its ends bent over to lock the clamp in place.

In testimony whereof I have hereunto subscribed my name.

DAVID T. ELLIS.

Witnesses:
C. H. BELKNAP,
A. H. WARNER.